United States Patent [19]
Bridges

[11] 3,802,593
[45] Apr. 9, 1974

[54] MOLDED PLACE SETTING WITH RIGID SUPPORT
[75] Inventor: John A. Bridges, Nashville, Tenn.
[73] Assignee: Aladdin Industries, Incorporated, Chicago, Ill.
[22] Filed: Feb. 16, 1972
[21] Appl. No.: 226,756

Related U.S. Application Data
[63] Continuation of Ser. No. 17,551, March 9, 1970, abandoned.

[52] U.S. Cl. ................. 220/23.6, 206/4, 220/9 F, 220/97 B
[51] Int. Cl. ............................................. B65d 21/02
[58] Field of Search ..... 220/23.4, 23.6, 23.8, 23.83, 220/23.86, 20, 97 B, 97 F, 9 F; 206/4, 72; D44/14; 217/25.5, 26.5

[56] References Cited
UNITED STATES PATENTS
D208,717  9/1967  Parish .................. D44/14
3,122,265  2/1964  Innis ..................... 206/4
1,745,606  2/1930  Densmore ............. 220/23.4
3,532,247  10/1970  Bridges ................ 220/23.6
1,926,916  9/1933  Reeves .................. 217/25.5

FOREIGN PATENTS OR APPLICATIONS
1,035,032  8/1953  France .................. 220/97 B
1,253,289  1/1961  France .................. 206/4

Primary Examiner—George E. Lowrance
Attorney, Agent, or Firm—McDougall, Hersh & Scott

[57] ABSTRACT

Means for serving individual food portions from central food preparation areas is provided by place settings, each having dished food holding receptacles molded on its surface and supported on a flat tray. Heat insulating elements with recesses or openings conforming and encompassing to the dished receptacles placed on the tray after individual food portions have been placed in the appropriate dished receptacles. Other trays, molded place settings and spacers in that order may be placed on top of the spaces to constitute a stack of trays and mats with insulation to maintain the food portions at their desired temperatures.

2 Claims, 6 Drawing Figures

MOLDED PLACE SETTING WITH RIGID SUPPORT

This is a continuation of application Serial No. 17,551, filed Mar. 9, 1970, now abandoned.

BACKGROUND OF THE INVENTION

This invention relates to food service systems for institutions. More specifically, it relates to means for food service in hospitals or the like institutions or to any situation where food is prepared in central location and individual portions are distributed to consumers.

Economical service of well prepared food at the optimum temperature at the time of service is an objective of many institutions such as hospitals or the like, transportation organizations such as airlines and mass feeding operations generally. Because of constantly increasing labor costs disposable means for holding individual food portions have come into use. However, the means available is all too frequently deficient in a number of respects. For instance, when food is prepared in large quantities well ahead of the serving time in a central area and then distributed to the consumer in an institution or traveling on an airplane, often that which is desired to be hot will be cold and that which is desired to be cold will be warm or melted at the time of service. In addition to service at the desired temperature, eye appeal not only of the food but the service means is important and this is lacking in the available systems.

Therefore, it is an object of this invention to provide an economical food service system which will maintain individual food portions at the optimum temperature for serving.

It is another object of this invention to provide a food service system using disposable elements which are physically attractive and yet at the same time are economical.

BRIEF SUMMARY OF THE INVENTION

These and other objects are achieved by a food service system which uses disposable dished placemats resting on trays and separated by an insulating spacer from similar trays and mats above and/or below.

BRIEF DESCRIPTION OF THE DRAWINGS

An embodiment of the invention is described hereinafter and its structure and mode of use may be understood by reference to the detailed description taken in connection with the drawings in which.

DETAILED DESCRIPTION

Figure 1:
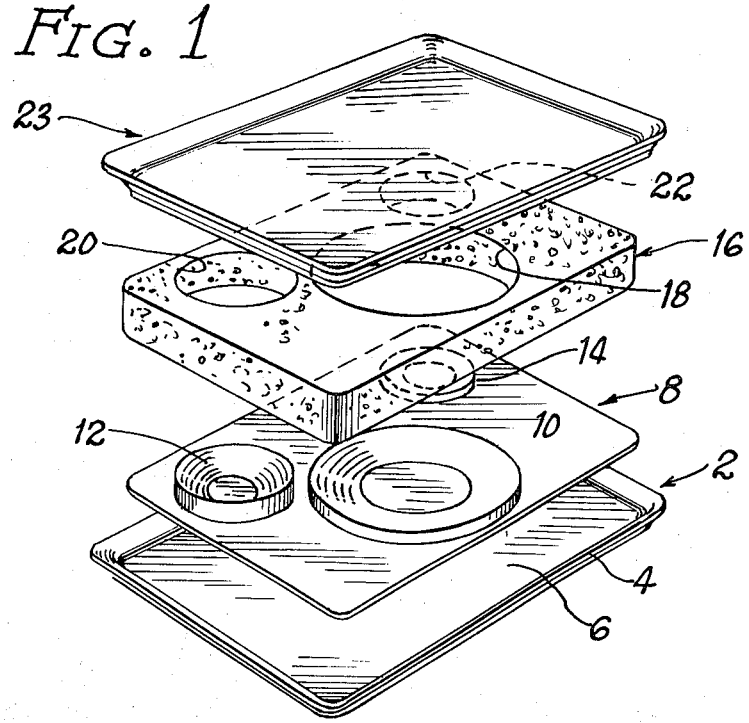
FIG. 1 is an exploded perspective illustration of trays, placemats and spacers in accordance with the invention.
Figure 2:
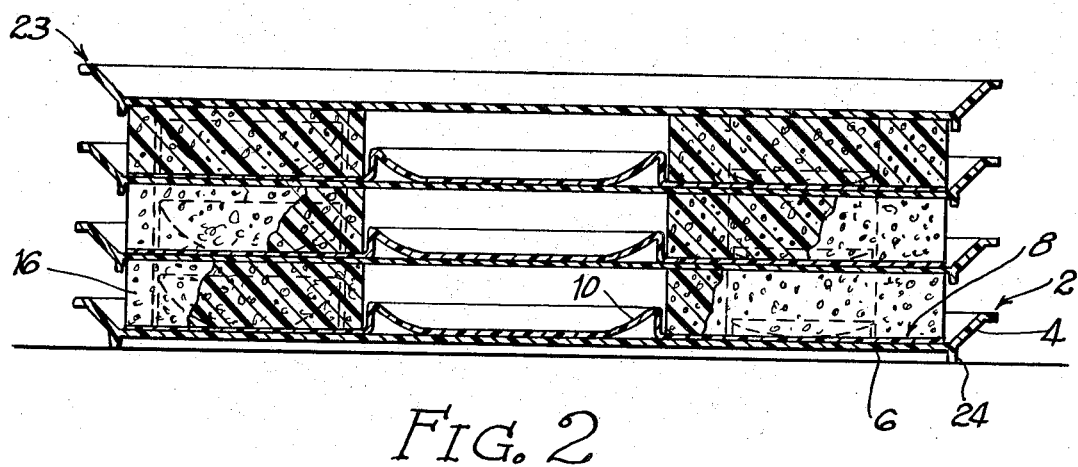
FIG. 2 is a front view, partially in section, of a stack of trays, placemats and spacers in accordance with the invention.

FIGS. 1 and 2 illustrate food service means constituting an embodiment of the invention. The system includes a tray support 2 formed in the illustrated embodiment as a rectangular member with upstanding sides 4 and a bottom 6. The tray may be formed by molding a plastic or fiber composition by pressing or cutting it from such material.

Positioned on the bottom of the tray is a disposable place setting or mat 8 which includes a plurality of formed sections in the form of dishes. One formed section may be in the form of dinner plate 10, another in the form of a salad or dessert plate 12 and still another in the form of a saucer 14. Preferably, the placemat is that illustrated and described in my copending application Ser. No. 845,411, filed July 28, 1969 for "Disposable Place Setting Construction." As described in that application, a disposable place setting may be formed out of plastic or pulp-type paper to have desired dished food receiving area on its surface and constitutes an economical place setting for a single use.

In use, when food is prepared in large quantities individual portions may be placed in the formed sections which constitute dishes and plates. A beverage may be served in a cup and the cup placed in the section formed as a saucer.

After individual servings have been completed, an insulating element or spacer 16 formed to have a height greater than the height of any food portion placed on a formed portion or a cup placed in a saucer portion 14 is placed on the tray. The spacer 16 is provided with vertically extending openings or holes 18, 20 and 22 corresponding in location to the formed sections on the place setting 8. The holes are dimensioned to have diameters or extents sufficient to permit the bottom of the spacer to rest on the place setting around each of the formed sections so as to form a compartment for each formed section and the food portion thereon. Other trays, place settings and spacers in that order may be placed on top of the spacer to form a stack of individual food servings which may then be transported to the consumer.

The spacer 8 may be formed of any suitable insulating material. Styrofoam or other foamed plastic may be used as it is easily formed and economical. By virtue of its insulating qualities each food portion will be maintained at a temperature suitable for serving for a period sufficient to permit their distribution to the point of consumption. Because the compartments formed by the openings in the spacer are insulated from each other as well as from the outside foods different temperatures may be served with the assurance that they will not act to heat or cool each other. Thus, foods intended to be served hot such as meat and vegetables may be served on the formed section 10 while a cold food such as ice cream or salad may be served on the section 12 and each will be maintained at its desired temperature. A lid or top 23 may be placed on the top of the stack to function as an insulating area.

Figure 3:
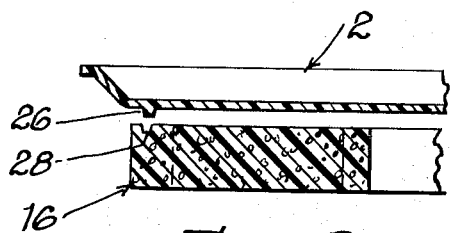
FIG. 3 is a partial view in section of an alternative embodiment.

When stacking the trays, place settings and spacers, it may be found desirable to provide means to prevent them from slipping. To this end a ridge 24 may be formed on the bottom of the trays around its periphery to encompass the spacer on which it is stacked. Alternatively, as shown in FIG. 3, a ridge or tongue 26 may be provided on the bottom of the trays to engage in grooves 28 formed in the top surface of the spacers. Such tongue in groove construction will act to prevent a stack of trays and spacers from slipping but will also function as a seal to hold down heat losses and gains to and from the outside of the compartments formed by the spacer.

Obviously, the tray, place settings and spacers need not be rectangular. Likewise, the formed sections may be varied in shape, size and location.

Figure 4:
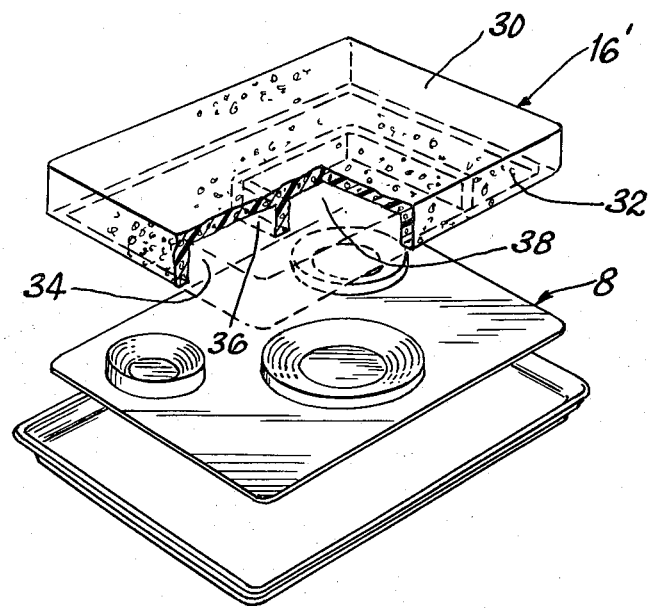
FIG. 4 is an exploded perspective view of an alternative embodiment of the invention.

In FIG. 4, an insulating element 16' is formed with a closed upper surface 30 and downwardly depending side walls 32 to form a recess 34 closed on five of its six sides. The element 16' is placed over the place setting 8 and insulates food portions in the various sections thereof by enclosing them within the recess 34. If desired, the element 16' may be formed with an interior insulating wall 36 depending from the upper surface 30 to provide an enclosure 38 insulating one or more food items from the remainder on the place setting in those situations where it is desired to hold such food items at a temperature different from that of the remaining food items. This embodiment of the invention may be used in those situations where it is desired to provide individual food service from a central area to remote locations.

Figure 5:
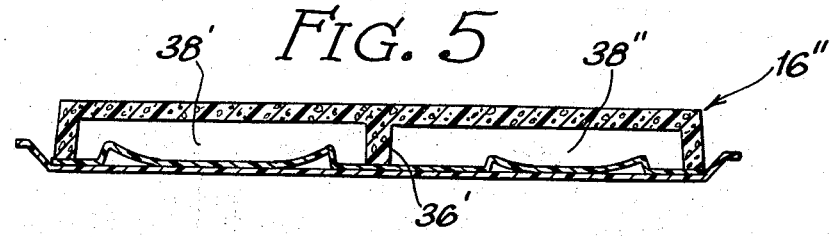
FIG. 5 is a front view partially in section of still another embodiment of the invention.
Figure 6:
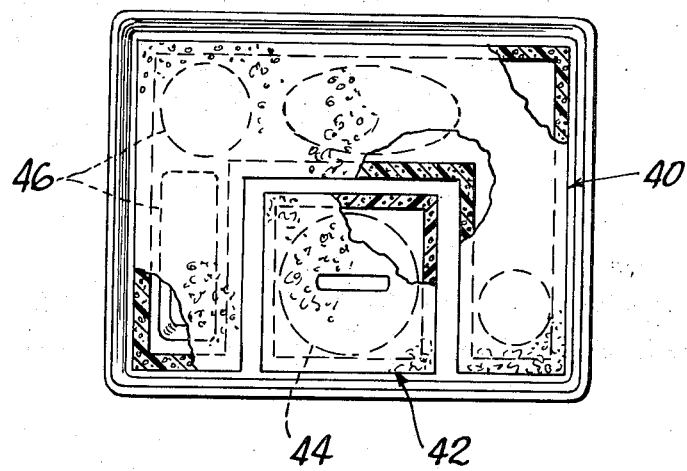
FIG. 6 is a plan view of a fourth embodiment of the invention.

The embodiment of FIG. 5 is likewise designed to be used in those situations where individual food service may be desired. In this embodiment, the insulating element 16'' may be provided with a divided wall 36' to provide two enclosures 38' and 38'' so that hot foods may be placed in one enclosure to be insulated from cold foods placed in the other enclosure.

Another form of the invention suitable for individual food service provides two separate elements 40 and 42 either one or both of which may be formed from insulating materials. For instance, the elements 42 may be formed from an insulating material to encompass and enclose a formed section 44 on the place setting 8 on which may be served an entree or main course intended to be served hot. The other element 40 may be formed of insulating or non-insulating material, and if formed of a non-insulating material, will protect food items and eating utensils placed in the sections 46 of the place setting 8 from the atmosphere while the assembly is in transit from a central area to a remote location. In this form of the invention the person consuming the food may remove the element 40 in order to have access to the eating utensils and items such as salad or soup while maintaining the main course warm under the element 42 until it is desired to be eaten.

Other changes and modifications may be made in the above-described construction which provides the characteristics of the invention whithout departing from the spirit thereof, particularly as defined in the following claims.

What is claimed as new and desired to be secured by Letters Patent of the United States is:

1. A food service system comprising a flat support, a placemat having a flat bottom surface and an upper surface, a plurality of spaced apart integrally formed dished sections, each having an outer side extending upwardly from said upper surface, a flat bottom disposed in the same plane as said flat bottom surface, and inner side walls sloping from said outer side wall toward the bottom of the dished section, an insulating element having a height greater than that of said dished sections, a flat lower surface and a flat upper surface, a plurality of openings corresponding substantially to said dished sections formed with vertical side walls in said insulating element extending from said flat upper surface to said flat lower surface, said insulating element resting on said upper surface of said placemat with the vertical side walls of each opening encompassing a corresponding dished section so as to provide an insulated compartment around each dished section of a size sufficient to accommodate completely the dished section and any food portion which may be placed therein.

2. A food service system as set forth in claim 1 comprising a plurality of supports, placemats and elements stacked in that order whereby food served as individual portions into said sections is insulated by said elements and may be held in the stack until served.

* * * * *